United States Patent [19]

Birkeholm

[11] 4,113,041

[45] Sep. 12, 1978

[54] METHOD AND TRACTOR FOR TOWING AIRCRAFT

[76] Inventor: Mogens Birkeholm, Kagsaavej 59, DK-2730 Herlev, Denmark

[21] Appl. No.: 786,565

[22] Filed: Apr. 11, 1977

Related U.S. Application Data

[63] Continuation of Ser. No. 584,029, Jun. 5, 1975, abandoned.

[30] Foreign Application Priority Data

Jun. 15, 1974 [GB] United Kingdom ............... 26624/74

[51] Int. Cl.² ............................. B60D 7/00; B60T 8/02
[52] U.S. Cl. ................................ 180/14 C; 188/112 R; 244/50
[58] Field of Search ................. 180/14 C, 14 R, 14.5, 180/45; 188/112; 244/50

[56] References Cited

U.S. PATENT DOCUMENTS

| | | | |
|---|---|---|---|
| 2,808,119 | 10/1957 | Steinman | 180/14.5 |
| 3,709,522 | 1/1973 | Olson | 180/14 C |
| 3,955,652 | 5/1976 | Nilson et al. | 118/112 |
| 4,007,890 | 2/1977 | Bremer et al. | 180/14 C |

Primary Examiner—Robert R. Song
Assistant Examiner—Donn McGiehan
Attorney, Agent, or Firm—Kenyon & Kenyon

[57] ABSTRACT

A sensing element in the towbar of an aircraft towing tractor continuously measures the traction and pressure forces transmitted between the tractor and the aircraft. An automatic control unit uses the measured values to adjust the traction-effect of the tractor, and/or the braking of the aircraft — either singly or in combination — to keep the towbar forces within a predetermined permissible interval. In one operating mode, braking signals generated by the tractor operator actuate the aircraft brakes directly, the tractor brakes being applied by the automatic control unit only if the towbar traction force exceeds the permitted limits. For additional safety, a separate force sensor may actuate an emergency release system to separate the aircraft from the tractor in response to towbar forces outside a predetermined range. For additional safety, a separate force sensor may actuate an emergency release system to separate the aircraft from the tow bar, in response to towbar forces outside a predetermined tolerance range.

10 Claims, 4 Drawing Figures

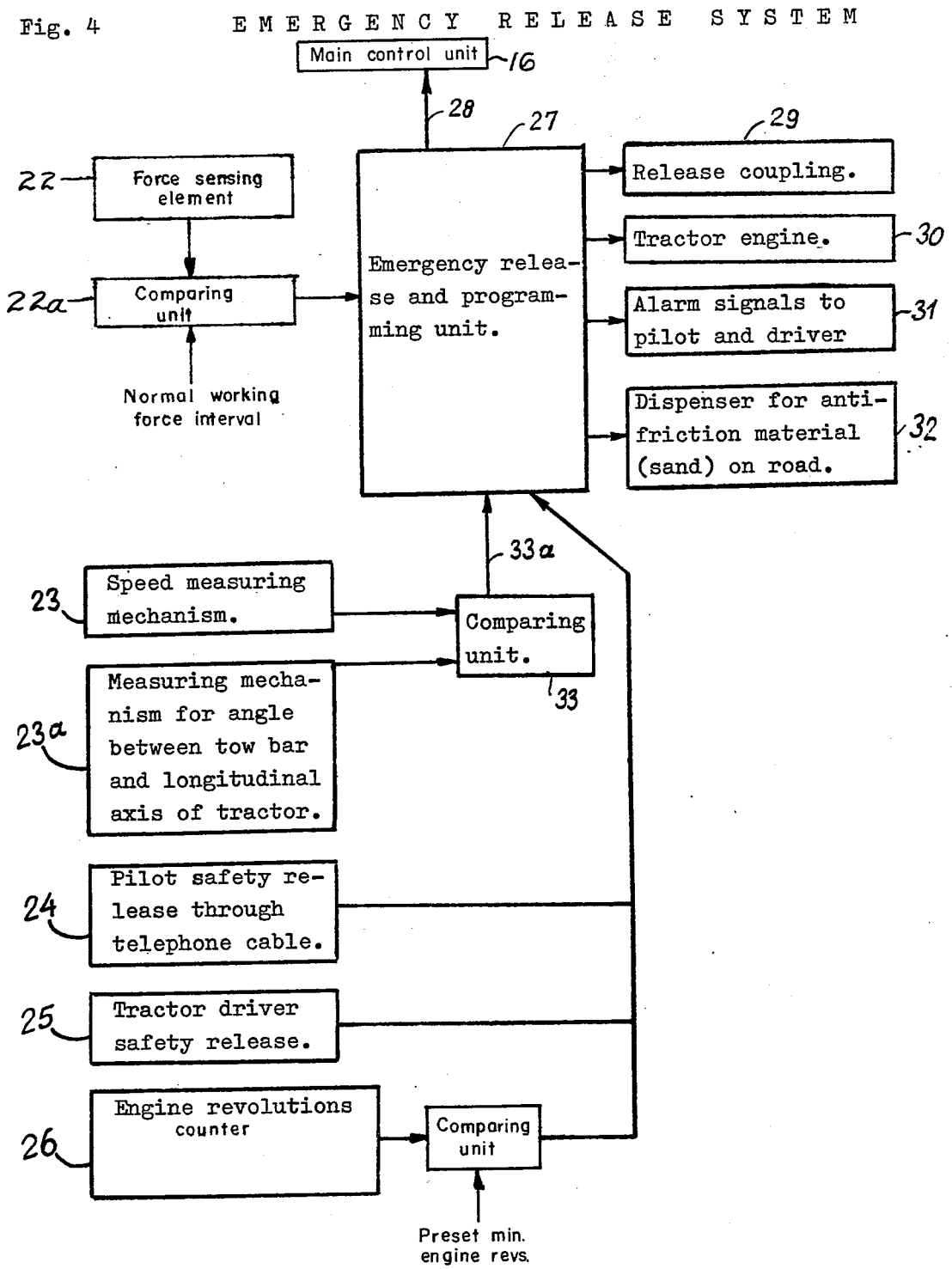

METHOD AND TRACTOR FOR TOWING AIRCRAFT

This is a continuation of my copending application Ser. No. 584,029, filed June 5, 1975, now abandoned.

BACKGROUND OF THE INVENTION

The invention concerns a method for towing of an aircraft by means of a tractor which is attached to the aircraft, mainly to the nosewheel of the aircraft.

When towing an aircraft by means of a tractor under the known technology, a tractor driver usually carries out the towing which takes place at low speed, i.e. not over 10 miles/hour (16 km/h), alone. Such towing of aircraft takes place when empty aircraft are moved around in an airport and when loaded aircraft are towed away from a gate to a place where the engines of the aircraft can be started up. However, it would be desirable if fully loaded aircraft could be towed at higher speeds than that mentioned above. If that could be safely achieved, taxiing of aircraft could be done by tractor tow instead of under the power of the engines of the aircraft. This would result in a considerable fuel saving. However, two important problems prevent this from being achieved with the known technology.

First, such great forces between the aircraft and the tractor may develop during towing at higher speeds that the nose-wheel structure of the aircraft is unable to transmit them. Moreover, instability in the power transmission may easily cause directional instability with the danger of a jackknifing of the tow-train.

Second, leaving the full responsibility for a fully loaded aircraft being towed at high speed with a tractor driver is hardly acceptable.

SUMMARY OF THE INVENTION

Accordingly, it is an object of the invention to conserve fuel in taxiing of aircraft to a runway.

It is another object of the invention to be able to tow aircraft at speeds higher than 16 kilometers/hour (10 miles per hour).

It is another object of the invention to detect and compensate for excessive towing forces during the towing of an aircraft by a tractor.

It is another object of the invention to avoid instability between a tractor and a towed aircraft during towing.

Briefly, the invention provides a method and a tractor for towing aircraft. The method is characterized in that during towing a continuous measuring of the traction and pressure forces transmitted between the aircraft and the tractor is carried out, and that the values produced by the measuring are used for the automatic control or adjustment of the traction-effect of the tractor, the braking of the tractor and/or the braking of the aircraft — singly or by a combination of these factors, so that the forces transmitted between aircraft and tractor are kept within a determined permissible interval.

Thus, it is fully possible to overcome the two drawbacks mentioned. Firstly, it will be possible by means of the automatic control to control the traction effect and braking of the tractor in such a way that no damage can be done to the nosewheel of the aircraft while, at the same time, permitting the tractor to have the weight necessary for obtaining the maximum friction against the road surface needed for starting, etc. Through the application of commonly known automatic systems, an automatic control system can easily be built which will ensure that the forces existing between the tractor and the aircraft will be kept within a predetermined interval, particularly if the tractor has a hydraulic or electric power transmission which is the case where large tractors, designed for the towing of aircraft, are concerned. Automatic control mechanisms of the kind mentioned are known, e.g. the automatic controls which cause artillery guns to move in coordination with an aiming device.

Secondly, it is possible to avoid that the tractor driver has the exclusive command of the tow-train, since it will always be possible for the pilot of the aircraft to execute a braking with the brakes of the aircraft. Such a braking results in an increase of the traction forces between aircraft and tractor, causing activation of the automatic control and resulting braking of the tractor until traction forces have come back to a determined value.

According to the invention it will be an advantage if the values resulting from the continuous measuring are used for superior control, which cannot be altered by the person(s) in control of the tow-train in a way detrimental to the stability and safety of the tow-train. It will be possible to control the measured signals in such a way that these have priority over certain other signals, e.g. signals which endeavour to increase the traction or braking power of the tractor beyond the permitted limits. On the other hand, the measured signals may not have priority over a signal which endeavours to increase the braking of the aircraft. On the contrary, such a signal should be carried through and result in an increased traction between the aircraft and the tractor. This, in turn, shall result in a braking of the tractor so that the forces between the aircraft and the tractor lie continuously within the permitted interval. Thus, not even human interference will be able to make the forces between the aircraft and the tractor exceed the permitted limits, whereas at the same time it is still possible to brake the tow-train by activation of the brakes of the aircraft.

The method is furthermore characterized in that the automatic control of the tractor is arranged in such a way that the tractor seeks, under all circumstances, to steer itself into a position where a constant traction between aircraft and tractor will be present. By having the automatic control arranged in such a way that a positive traction between aircraft and tractor is always present, a stabilizing effect on the tow train will always be present, even during braking. This is very important for the maintenance of stability, particularly under slippery conditions. If a pressure force between tractor and aircraft were to be allowed there would be a risk, under unfortunate circumstances in slippery conditions, that the tractor would veer under the aircraft wringing off the nosewheel.

According to the invention, it is appropriate that braking of the tow-train be primarily executed by way of the brakes of the aircraft. In the light of the aforementioned, the advantage of this principle is obvious, but it should further be considered that a braking can be executed more safely by the aircraft considering that it has a mass 5 to 10 times greater than that of the tractor and, furthermore, the aircraft possesses an anti-skid system designed to maintain a straight course of the aircraft during braking on a slippery surface.

If the tow-train is controlled by the driver of the tractor, the method can be characterized in that the signal for activation of the brakes of the aircraft is transmitted visually or by audio means, e.g. radio or telephone, from the tractor driver to the pilot of the aircraft. The pilot then varies the degree of braking dependent on the signal received so that a pressure force registered between aircraft and tractor will increase the traction effect of the tractor to a suitable value independent of the maneuvering signals which the tractor driver might give, and a registered tractor force that surpasses a certain limit will regulate the traction effect or braking of the tractor to such a degree as to bring the traction under the limit mentioned, independently of the maneuvering signals which the tractor driver might give. By letting the tractor driver do the actual controlling of the tow-train, a simple operation is achieved, as the tractor driver will typically have intimate local knowledge of the airport. The role of the pilot is simple, consisting partly in braking when he (the pilot) considers that this is appropriate. Because of his elevated position the pilot has a better view, fitting in well with the fact that it is the pilot who carries the responsibility for the aircraft and passengers.

According to the invention it is also possible that the braking signals are transmitted directly to the brake system of the aircraft and that the brake system of the tractor is activated only when the pull between aircraft and tractor during a braking procedure exceeds a certain value. In this way, the need for transmission of visual or audio signals from the driver of the tractor to the pilot can be eliminated. At the same time, it will be possible to tow an empty aircraft without a cockpit crew safely at a high speed. Thus, much time can be saved as service sectors of airports are often situated far from the traffic handling sectors. Even if the driver of the tractor has the possibility of directly activating the brakes of the aircraft, this does not necessarily exclude the possibility for the pilot to assist in or supplement the braking by activating the brakes of the aircraft.

The method can also be characterized by remote control by the pilot of the aircraft of the effect and wheel position of the tractor in that braking of the tow-train is executed by activation of the brakes of the aircraft. This is carried out by having a registered pressure force between aircraft and tractor increase the traction effect of the tractor to a suitable value independent of the maneuvering signals which the pilot might give and by having a registered traction force in excess of a certain limit regulate the effect or braking of the tractor sufficiently to bring the tractor force back inside the limit regardless of the signals which the pilot might give. This achieves the advantage that all responsibility for the towing at high speed is removed from the driver of the tractor.

The invention also concerns a tow-tractor designed to carry out the procedure with a towbar hinged to the rear end of the tractor. This tractor is characterized by the incorporation into the towbar or at the coupling of the tractor for the towbar of a sensing element for measuring the push or pull force transmitted to or from the aircraft. The tractor is equipped with a hydraulic or electric traction effect transmission and brakes arranged for control on the basis of the measured values by means of a programming or control unit. Such a tractor will be easy to build as most tractors for towing of large aircraft are already equipped with an electric or hydraulic power transmission. This being the case, it is easy to introduce an automatic adjustment or control unit which keeps the forces transmitted between the tractor and the aircraft within certain permissible limits. This is a very decisive factor as this facilitates the realization of the fuel saving measures, which are the chief object of the invention, with minimal investment requirements and by use of automatic sensor and control devices known from other technical areas such as artillery guidance systems.

According to the invention, the tractor can also be equipped with an indicator mast which may incorporate a signal indicating whether all command functions are executed by the driver of the tractor or whether he desists from certain functions, e.g. braking, or all maneuvers. The purpose of such an arrangement is safety.

The mast can also be arranged in such a way as to indicate the position of the tractor wheels. Such an arrangement will be necessary if the pilot is to control the steering, as he will often be unable to see the tractor which will be hidden under the nose of the aircraft as seen from the cockpit.

If the pilot is to execute braking based on signals from the tractor driver, the mast can be fitted to give visual signals which indicate quantatively the brake effect wanted by the tractor driver. Such signals can be suitably realized by the incorporation into the top of the mast of a row of lamps side-by-side and connected to the brake pedal of the tractor in such a way that increasing pressure on the pedal will result in a corresponding increase of lamps lighted - the brake pedal under towing conditions being made unable to impart braking to the wheels of the tractor.

Finally, the mast can be constructed in such a way as to be lowered by being hinged or telescopic. This is necessary because the tractor must be able to operate under the aircraft fuselage when connected to the rear side of the nose gear, in order to haul the aircraft backwards where the available space in front of the aircraft is too restricted, or when moving an aircraft away from boarding gates or the like.

The tractor may furthermore be characterized by containing automatic control systems which, based on the forces measured in the towbar, adjust the speed of the tractor in such a way that by and large a constant traction force is maintained in the towbar, however in such a way that the largest achievable traction force decreases gradually with increasing driving speed. Another similar or corresponding automatic and independent control system may also be incorporated in the tractor to cause an emergency release of the tractor from the aircraft, regardless of all other signals, should the force exceed a predetermined interval or tolerance range under abnormal circumstances.

By letting the maximum obtainable traction force decrease with the driving speed, the aircraft brakes may be spared because a braking from high speed can be carried out without a large traction force being generated in the towbar. An automatic release of the tractor from the aircraft, regardless of all other signals, will provide extra safety and the activation thereof will be independent of the other automatic system in case these should fail.

The tractor may be programmed, following an emergency release, to move at a slightly higher speed for some seconds after the release until the tractor driver can take over the maneuvering of the tractor. This ensures that the tractor will separate definitely from the aircraft and will not collide with the aircraft.

The tractor may be characterized by that the towbar contains a telescopic mechanism at the rear end whereby the extreme end of the towbar can be retracted and extended. This will facilitate easy attachment of the tractor to the aircraft. The telescopic mechanism may incorporate an automatic retraction mechanism, the towbar being fully extended during towing. In this way, the coupler parts at the end of the towbar and on the nose gear of the aircraft can be quickly disengaged so as to avoid damage when emergency release takes place.

The tractor may also be fitted with mechanisms for emergency release which are activated from the driver cab of the tractor or from the aircraft cockpit. This increases safety.

The tractor may also be fitted with a device for the measuring of the angle between the longitudinal axis of the tractor and the towbar in the horizontal plane and with a means for activating the emergency release procedure when the angle exceeds a certain angle $\alpha$. In this way, a means of redress is provided in the case of a skidding by the tractor, a means quite independent of the other means described. This means may well prove so significant as to be decisive for the acceptance of the practical application of the present invention. A suitable design of this safety device is characterized in that the critical value of the angle $\alpha$ varies with the speed so that the angle $\alpha$ diminishes when speed is increased. Thus, the allowable turning radius decreases with decreasing speeds. At low speed, it is not decisive if a skid takes place; whereas the angle variation allowed at high speed will be very small, as skidding could have catastrophic results.

The tractor may also be fitted with means for the spraying of an anti-skid material, e.g. sand, in front of the wheels. These means may possibly be automatically activated as part of emergency procedures.

A version of the tractor may be equipped with an auxiliary power unit or ground power unit (APU or GPU). In this way, the aircraft can be supplied with power during towing and at the end of the towing for the starting up of the aircraft engines. In a detectable version, this power unit may also supply aircraft with power during stays at airports.

The tractor may also be fitted to carry ballast in the form of a fire extinguishing fluid or powder, and operating equipment for this material may be fitted. Thus, airport safety is increased and some conventional fire equipment can be saved since an average airport will have a considerable number of tractors, and these will be dispersed over a large area of the airport.

BRIEF DESCRIPTION OF THE DRAWINGS

These and other objects and advantages of the invention will become more apparent from the following detailed description and appended claims taken in conjunction with the accompanying drawings in which:

FIG. 13 is a flow diagram of an embodiment of the main control system according to the invention;

FIG. 4 is a flow diagram according to an embodiment of an emergency release system of the invention.

DESCRIPTION OF THE PREFERRED EMBODIMENTS

Figure 1:
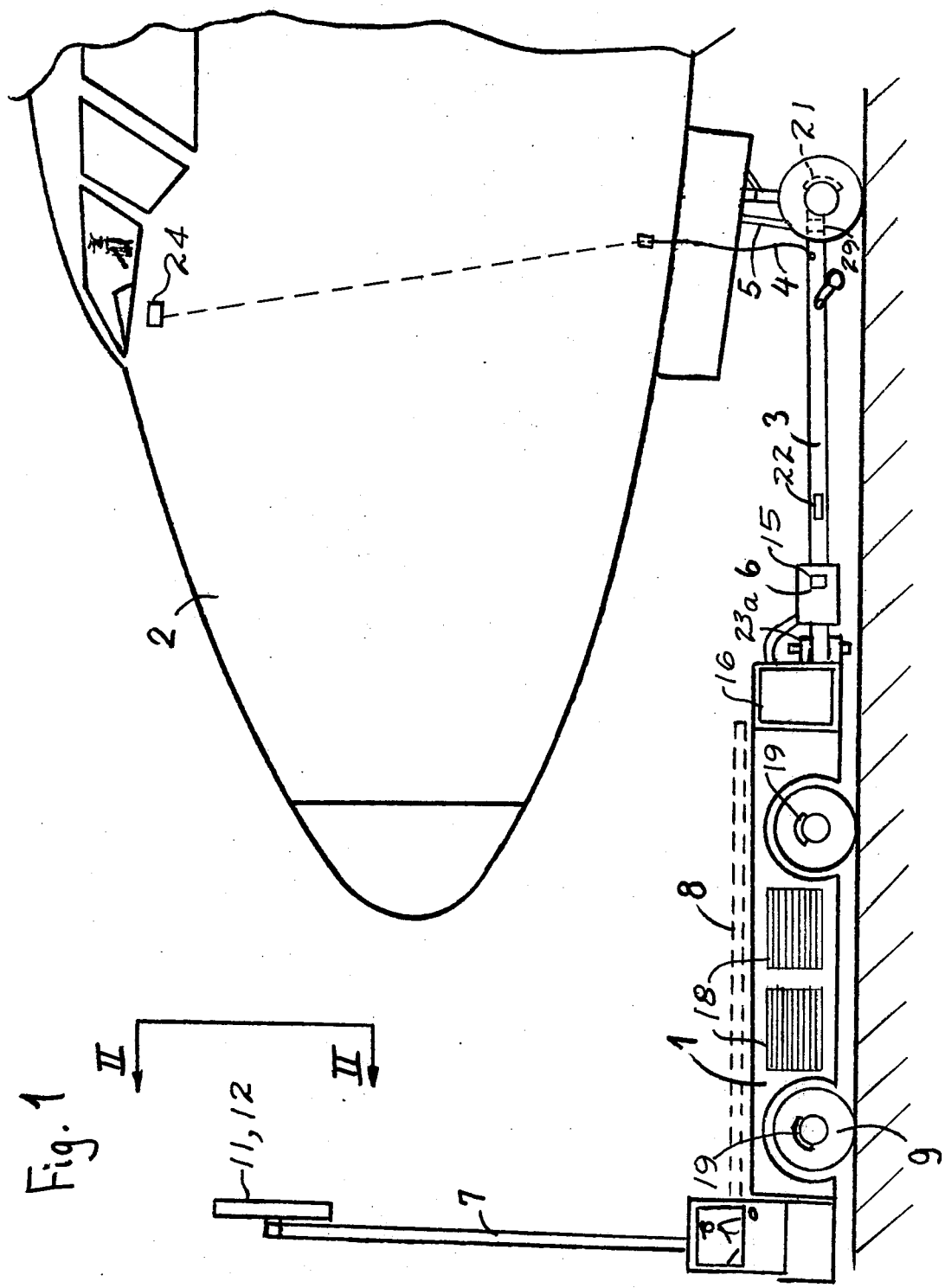
FIG. 1 is a side view of a tractor according to the invention towing an aircraft, which is only partly shown.

Referring to FIG. 1, a tractor 1 is hitched to an aircraft 2 via a tow bar 3 for towing purposes. There may furthermore be cable connections between the tractor 1 and the aircraft 2 for the delivery of control and/or communication 4 and power 5 from the tractor 1 to the aircraft 2. Alternatively, use may be made of radio contact between the driver of the tractor and the pilot, and if the aircraft itself has an auxiliary power unit, there may be no power connection to the tractor. The tractor 1 may be of conventional construction having a hydraulic or electric power transmission.

A sensing element 15 of known construction is mounted in the tow bar 3 or at the position of the tractor 1 where the tow bar 3 is coupled. This sensing element is able to perform a continuous measuring of the force transmitted through the tow bar between the tractor 1 and the aircraft 2. Such a sensing element may be hydraulic and integrated in a shock absorber 6, or may be electrical, for example of the widely used strain gauge type. The signals from the sensing element are continuously transmitted and are used for controlling purposes as explained later.

An indicated mast 7 is mounted on the roof of the tractor 1 at the front end of the tractor. This mast 7 can be laid down on the roof of the tractor 1 as shown at 8. The mounting of the mast 7 may also be arranged so as to be totally countersunk in the roof of the tractor 1 when laid down. This enables the tractor to pass under the aircraft 2, when maneuvering the aircraft 2 backwards. The position of the mast 7 will be able to indicate to the pilot the position of the front end of the tractor 1 in relation to the nose of the aircraft 2, as the proportions of aircraft 2, tow bar 3 and tractor 1 often are such that it is impossible for the pilot to see the tractor 1 itself — as shown in the drawings.

Figure 2:
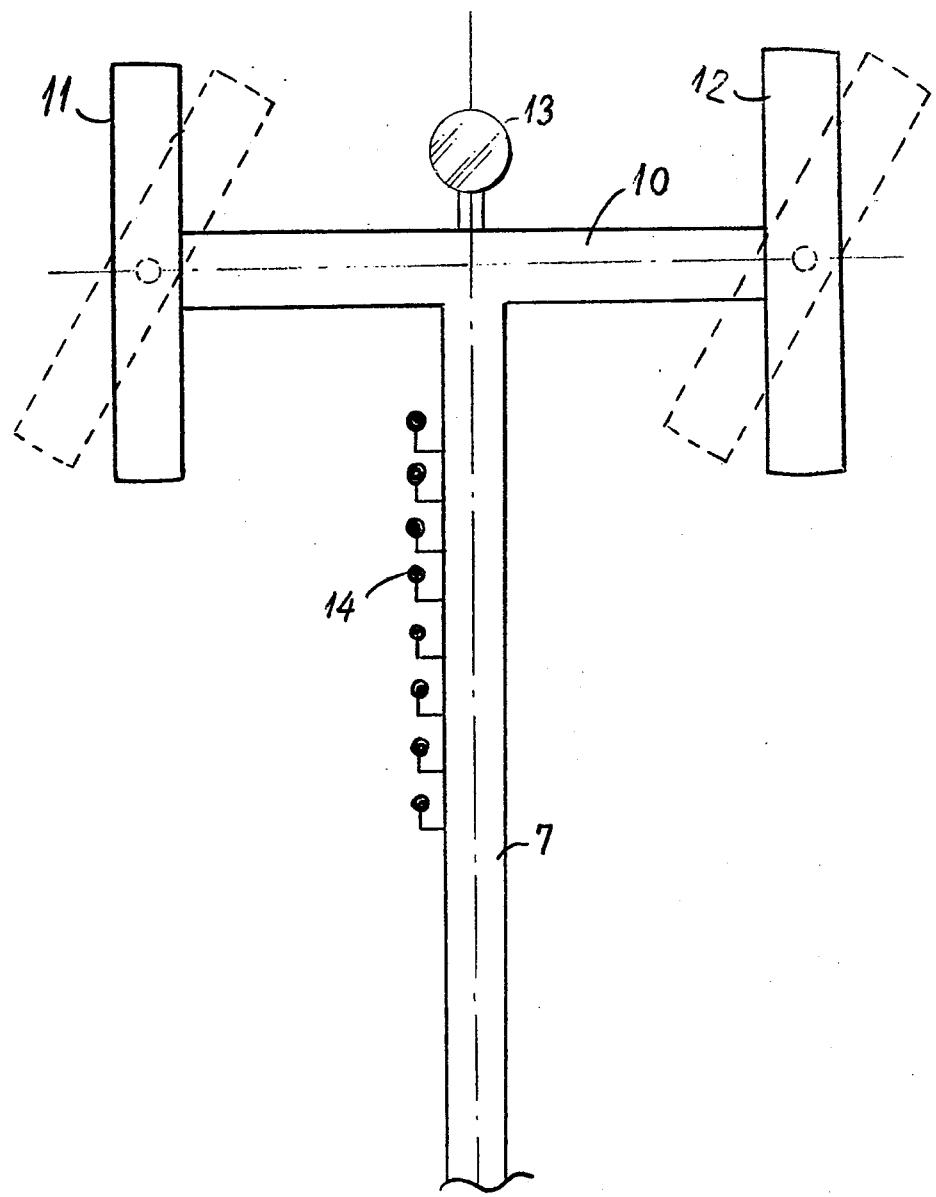
FIG. 2 is a view taken on line II—II in FIG. 1 of an indicator as seen from a pilot's seat.

The top of the mast 7 is also provided with means for indicating the angular position of the front wheel 9 of the tractor 1. These means, as seen from behind, i.e. from the pilot's position, are shown in a preferred embodiment in FIG. 2 and include a horizontal bar 10 at the top of the mast 7 and two parallel indicating rods 11, 12 carried on the bar 10 symbolizing the front wheels of the tractor 1 seen from above. In the position shown, these rods 11, 12 are vertical, thereby showing that the turning angle, i.e. the angle between the front wheels and the longitudinal axis of the tractor, is 0°. The connection between these rods 11 and 12 and the front wheels of the tractor is not shown. When the tractor wheels are turned to the right the position of the rods 11 and 12 will be as shown by dotted lines. As the landing lights of the air-craft 2 will be switched on when dark, the rods 11, 12 will preferably be covered with a reflecting material to assist the pilot is seeing them. Furthermore, the mast 7 may be fitted with signal lights, first of all a main signal light 13, which is on when a high speed towing operation is performed, and secondly a row of lights 14 connected to the braking pedal of the tractor 1 to indicate how hard this pedal is pressed. When, for instance, a light pressure is exerted on the pedal some of the lowest lights 14 will be illuminated, and if the pedal is pressed very hard all lights 14 will be on.

Figure 3:
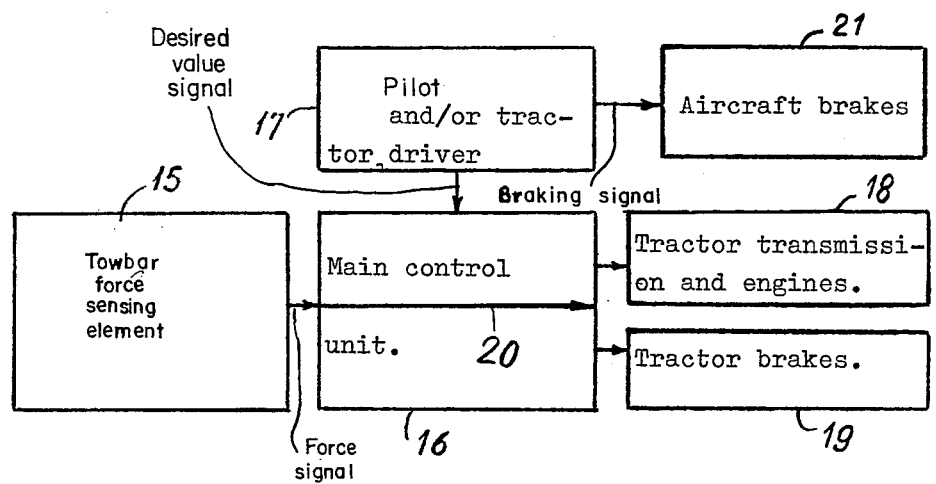

FIG. 3 shows the flow of signals according to the main control system. This control system includes the sensing element 15 in the tow bar connection for the continuous measuring of the forces in the tow bar connection. The values measured are continuously transmitted on an automatic main control unit 16 in which the measured values are compared to the desired values coming from the pilot and/or the tractor driver 17. If the desired values differ from the measured values, the control unit 16 will transmit control signals to means for adjusting the traction effect of the tractor, such as the tractor transmission and engines 18 or the tractor brakes 19 so as to bring these values in coincidence provided that the force in the tow bar 3 is still inside a certain permitted tolerance interval. However, if this is not the case, then the signals from the sensing element 15 will be given a certain degree of priority, symbolized by the arrow 20, so as to maintain the tow bar forces within the permitted limits. Braking signals coming from the pilot and/or the tractor driver are transmitted direct to the brakes 21 of the aircraft as shown. Such signals will, due to the inertia of the tractor and/or the traction effect delivered by the tractor engine, often result in an increased pulling force in the tow bar 3. This will, however, be compensated by the automatic control, which will at any time keep the force within the permitted tolerance limits. In this way, a braking of the tractor wheels will often be the result through the automatic control unit 16.

It will now be explained how the methods according to the invention work under normal conditions.

The aircraft is loaded and ready to be towed on the taxiway to the runway holding position, where its engine should be started up. If the aircraft is fitted with an auxiliary power unit this could be started up before the towing starts. It not, energy could be supplied from the tractor 1 through the cable 5. In any event, the tractor driver establishes the necessary connections and then he makes a low speed towing operation pulling the aircraft 2 away from the loading platform or gate in order to get the aircraft 2 free from obstacles or the like. After this, there are a number of possibilities when changing over to high speed towing. Usually there is a telephone connection between pilot and driver as shown through the cable 4. There may of course be a radio connection instead or as well. However, if the two persons are not speaking the same language there are two main methods in which the towing can be carried out. These methods can of course also be used when they are speaking the same language.

In the first one, the tractor driver undertakes the driving, i.e. the controlling of acceleration as well as the steering of the tractor. When he wants braking to take place, he presses his braking pedal. In this case, it is possible to have such a braking signal transmitted to the wheels of the aircraft, as shown in FIG. 3. In any case, such a braking signal should never under high speed conditions solely go to the brakes of the tractor wheels, as this can disturb the stability of the tow train seriously. Therefore, when the system is changed to such driving conditions, the light 13 is switched on, thereby telling the pilot that he is responsible ultimately for the braking. Any time the pilot wants to brake the speed of the tow train he can do so. Now, when the driver of the tractor wants to deccellerate, he will normally first take the power off the engine. Then he has two possibilities of transmitting a braking signal to the aircraft brakes, depending on the construction. In one embodiment, illustrated in FIG. 3, his brake pedal is directly connected to the brakes 21 of the aircraft through cable 4 or 5. The brake pedal may also be connected to the lamps 14 in order to let the pilot see what braking force is being used. In another embodiment, the brake pedal of the tractor is only connected to the lights 14, thereby signalling to the pilot how much the pilot should press his brake pedals (the pilot has two pedals). In any case, the pilot is able to brake or assist in the braking, and this will usually cause the automatic control to activate the brakes of the tractor.

According to the second main method of establishing high speed towing, the pilot directly gives all maneuvering signals to the tractor 1 through a remote control box, which is fitted in the aircraft. But the braking signals are established by pressing the braking pedals of the aircraft. The mentioned control box is not a part of the invention as remote control of for instance model aircraft or guns by means of a so-called joy-stick-mechanism is well known art.

Generally, the method according to the invention by which braking is established by means of the aircraft brakes is a safe system, because it gives no risk of jack-knifing of the tow train — as would be the case when braking is made by the tractor. Therefore, it is also preferred to set the lower limit of the mentioned interval of permissible forces in the tow bar above zero, i.e. to ensure that there will always be a positive pulling force in the tow bar and never a pushing force, i.e. a comparison force trying to push the tractor forward. Thereby a great stability is achieved and ensured.

To increase the safety there may be special mechanisms to initiate an emergency release of the tow bar from the aircraft — and such systems may be quite independent of the aforementioned control systems.

FIG. 4 shows a flow diagram of an emergency release system by which a number of different initiating elements can activate an automatic emergency release. The different initiating elements have the numbers 22–26 and are positioned in the left side (column) of the figure. The release system includes a sensing element 22 which continuously measures the forces in the tow bar 3 corresponding to the forces measured by sensing element 15. However, to increase safety there may be more sensing elements 22 which work independently of the sensing element 15. If forces in the tow bar exceed the normal working tolerance interval, or an interval which is a little larger, this will result in the activation of the emergency release and programming unit 27. Then a number of signals will flow from unit 27 immediately and simultaneously. The main control unit will be put out of service, symbolized by the arrow 28. The coupling 29 between the tow bar and the aircraft will be released. The tractor will be sped up via the tractor engine 30 for some seconds to ensure movement away from the aircraft before the tractor driver will be able to take over control of the tractor. To this end, it is necessary to feed the unit 27 continuously with the actual towing speed. This is done through a speed measuring mechanism 22 by direct connection. Furthermore, at the same time alarm signals 31 to driver and pilot are switched on. A mechanism 32 dispensing anti-friction material as for instance sand may also be activated.

There are also be a number of other safety mechanisms, which by themselves are able to initiate the automatic emergency release process. To avoid jack-knifing of the tow train, the tractor may be equipped with a mechanism (23a) which continuously measures the angle between the tow bar 3 and the longitudinal axis of the tractor. At a low towing speed, this angle can be great without any danger, but at greater speeds the permissible interval of this angle decreases. Therefore, the results of measuring speed and angle 23 and 23a are transmitted to a comparing unit 33 and if the combination of actual speed and angle are found to be dangerous, an emergency release will be initiated through line 33a.

If the pilot for some reason wants an emergency release, there may be means to transmit a signal through the telephone cable 4 symbolized in box 24. A similar tractor driver safety release 25 may also be provided for the tractor driver.

Furthermore, there may be a mechanism 26 for activating the emergency release when the engine revolutions of the tractor comes under a certain level. It is obvious that if for some reason the engine(s) of the tractor stops there may be a certain risk for jack-knifing of the towtrain. However, if the tractor is fitted with electrical or hydraulic power transmission it will, under normal conditions, be preferred to run the engine(s) of the tractor at constant speed during a towing operation. In this case, there will be enough inertia or energy in the tractor to bring the tractor 1 away from the aircraft, when the revolutions drop below a certain level. Furthermore, the normal reaction from the pilot, when he sees an emergency release take place, will be braking with the brakes of the aircraft, whereby the biggest possible safety can be achieved.

Besides the mentioned elements 22–26 to initiate an emergency release, there may of course be other or more elements or combinations. It should be mentioned that in the known art when towing aircraft, the nosewheel steering mechanism is put out of service to enable the tractor to change course. This is done by means of a tap, which is connected to a chain at the rear end of the tow bar, which tap is inserted into a hole at the nosewheel gear of the aircraft. When the tow bar is taken away from the aircraft, the chain ensures that the tap is pulled out again, thereby putting the nosewheel steering system into service again. Such a system can, of course, work as well in case of an emergency release according to the present invention.

What is claimed is:

1. Towing apparatus comprising
   a tractor having a front end and a rear end;
   a tow bar hinged to the rear end of the tractor and adapted to be coupled to a vehicle to be towed;
   a first sensing element for continuously measuring a force transmitted through said tow bar between said tractor and a towed vehicle and for continuously emitting a measured value signal in response thereto;
   means for generating a traction effect of said tractor; and
   a control unit for receiving and comparing said measured value signal with a desired value signal and for delivering a control signal to said traction effect generating means in response to a difference between said measured value signal and said desired value signal to selectively adjust the traction effect of the tractor.

2. Towing apparatus as set forth in claim 1 further comprising an emergency release system including at least one additional sensing element for measuring the force transmitted through said tow bar independently of said first sensing element and an emergency release unit responsive to the transmitted force measured by said additional sensing element falling outside a predetermined tolerance interval to deactivate said control unit and to uncouple a towed vehicle from the tow bar.

3. Towing apparatus according to claim 1 wherein the desired value signal is a braking signal, the apparatus further comprising a towed vehicle coupled to said tow bar, the towed vehicle having brakes, and
means for delivering the braking signal directly to the brakes of the towed vehicle.

4. Towing apparatus according to claim 3 wherein the braking signal is delivered from the tractor.

5. Towing apparatus comprising
   a tractor having a front end and a rear end;
   a tow bar coupled to the rear end of the tractor;
   a sensing element mounted in said tow bar for continuously measuring the force transmitted through said tow bar and for continuously emitting a measured value signal in response to said transmitted force;
   means for generating a traction effect by said tractor;
   brakes for stopping said tractor; and
   a control unit for receiving and comparing said measured value signal with a desired value signal and for delivering a control signal to one of said means for generating a traction effect and brakes in response to a difference between said measured value signal and said desired value signal to selectively increase the traction effect of said tractor or brake said tractor.

6. A method of towing an aircraft having nose wheel gear which comprises the steps of
   attaching a tractor having means for generating a traction effect and braking means to the aircraft nose wheel gear;
   continuously measuring the traction and pressure forces between the aircraft and the tractor during towing to produce responsive signals representative of the measured values of the forces;
   continuously transmitting said measured value signals to a control unit;
   comparing the values of said measured value signals to a desired value to produce control signals in response to differences between said measured values and said desired values; and
   transmitting said control signals to the means for generating a traction effect of the tractor to bring said measured values of the forces into coincidence with said desired value within a predetermined tolerance interval of forces.

7. A method as set forth in claim 6 wherein the tractor is automatically braked in response to the measured value of traction forces between the aircraft and the tractor exceeding the maximum traction value of said predetermined tolerance interval.

8. A method as set forth in claim 6 which comprises the step of automatically increasing the traction effect of the tractor in response to the measured value of forces between the aircraft and the tractor being below the minimum value of said predetermined tolerance interval.

9. A method as set forth in claim 8 in which said minimum value represents a preselected minimum pulling force.

10. A method as set forth in claim 6 comprising
    braking the aircraft in response to said desired value and
    automatically braking the tractor in response to the measured value of traction forces between the aircraft and the tractor exceeding the maximum traction value of said predetermined tolerance interval.

* * * * *

UNITED STATES PATENT AND TRADEMARK OFFICE
CERTIFICATE OF CORRECTION

PATENT NO. : 4,113,041

DATED : September 12, 1978

INVENTOR(S) : Mogens Birkeholm

It is certified that error appears in the above—identified patent and that said Letters Patent are hereby corrected as shown below:

Col. 3, line 8, change "tractor" to --traction--.

Col. 3, line 48, change "tractor" to --traction--.

Col. 5, line 38, change "detectable" to --detachable--.

Col. 5, line 59, change "13" to --3--.

Col. 6, line 48, change "air-craft" to --aircraft--.

Col. 7, line 2, change "or" to --and--.

Col. 8, line 21, change "comparison" to --compression--.

Signed and Sealed this

Twelfth Day of December 1978

[SEAL]

Attest:

RUTH C. MASON
Attesting Officer

DONALD W. BANNER
Commissioner of Patents and Trademarks